United States Patent
Jang

(10) Patent No.: US 7,289,487 B2
(45) Date of Patent: Oct. 30, 2007

(54) APPARATUS FOR REDUNDANCY OF VOICE PROCESSING UNIT IN MEDIA GATEWAY SYSTEM, AND METHOD THEREOF

(75) Inventor: Seung-Ki Jang, Suwon (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 799 days.

(21) Appl. No.: 10/748,237

(22) Filed: Dec. 31, 2003

(65) Prior Publication Data

US 2004/0151163 A1 Aug. 5, 2004

(30) Foreign Application Priority Data

Jan. 3, 2003 (KR) .................. 10-2003-0000383

(51) Int. Cl.
*H04L 12/66* (2006.01)
(52) U.S. Cl. ...................... 370/352; 370/219
(58) Field of Classification Search ........ 370/352–358, 370/219, 220, 217, 265, 386, 387, 388, 389, 370/493–495, 474, 476
See application file for complete search history.

(56) References Cited

U.S. PATENT DOCUMENTS 7,088,739 B2 * 8/2006 DeMars et al. ............. 370/476
2006/0050738 A1 * 3/2006 Carr et al. .................. 370/474

* cited by examiner

*Primary Examiner*—Brenda Pham
(74) *Attorney, Agent, or Firm*—Robert E. Bushnell, Esq.

(57) ABSTRACT

A media gateway system and a method of substituting one unit for another in the system. The system uses cross point switches that are controlled by a main control unit. When a voice processing unit or a circuit interface unit or a packet interface unit malfunctions and another unit takes over the function of the malfunctioning unit, only the cross point switch setups need to be modified and not the settings in the TDM switch or the packet switch.

20 Claims, 11 Drawing Sheets

APPARATUS FOR REDUNDANCY OF VOICE PROCESSING UNIT IN MEDIA GATEWAY SYSTEM, AND METHOD THEREOF

CLAIM OF PRIORITY

This application makes reference to, incorporates the same herein, and claims all benefits accruing under 35 U.S.C. § 119 from an application for APPARATUS FOR REDUNDANCY OF VOICE PROCESSING UNIT IN MEDIA GATEWAY SYSTEM, AND METHOD THEREOF earlier filed in the Korean Intellectual Property Office on 3 Jan. 2003 and there duly assigned Ser. No. 2003-383.

BACKGROUND OF THE INVENTION

1. Technical Field

The present invention relates to N:1 redundancy of a voice processing unit in a media gateway system including a circuit switch unit and a packet switch unit, and more particularly, to an apparatus for redundancy of a voice processing unit which can reduce a redundancy switch time of the voice processing unit by simplifying a software processing procedure for connection information update or time-division multiplexing switch connection reset during the redundancy switch process, and a method thereof.

2. Related Art

In general, a voice processing unit (VPU) for transforming voice signals into packet data or vice versa is indispensably installed in a media gateway system having a circuit switch part and a packet switch part. However, if a VPU should happen to become disabled, such as during function failure or during removal of a board, the media gateway system needs to be able to continue to receive, switch, convert and send voice and/or packet data from a source to a destination. In media gateway systems, a redundant or a protection VPU can serve for another VPU that is inoperable. However, this often requires an enormous amount of software in the TDM switch and in the packet switch to send and receive data from the redundant VPU instead of from the disabled VPU. In the redundancy state, when the active VPU is switched to the protection VPU, connection information update or TDM switch connection reset of circuit line interface cards is performed by software, which increases a switch time.

Therefore, what is needed is a novel media gateway system and a method of processing signals that can more efficiently and effectively deal with a situation where a redundant VPU must be used in place of the original or active VPU in such a way that enormous resources in the TDM switch and the packet switch are not tied up.

SUMMARY OF THE INVENTION

It is therefore an object of the present invention to provide a novel design for a media gateway system that can substitute a redundant VPU for another VPU without consuming enormous resources in the TDM switch or in the packet switch.

It is also an object of the present invention to provide a method for processing voice and/or packet data calls in a media gateway system that can efficiently handle the situation where a redundant VPU is substituted for another VPU.

It is yet an object of the present invention to provide a media gateway system that also allows for efficient substitution of a redundant circuit interface unit for another circuit interface unit without generating an enormous software burden for either the TDM switch or the packet switch.

It is yet an object of the present invention to provide a media gateway system that also allows for efficient substitution of a redundant packet interface unit for another packet interface unit without generating an enormous software burden for either the TDM switch or the packet switch.

It is still yet an object of the present invention to reduce a redundancy switch time of a voice processing unit by simplifying a software processing procedure for connection information update or time-division multiplexing switch connection reset of various line interface cards during the redundancy switch process in a media gateway system.

These and other objects may be achieved by a media gateway system having N:1 redundancy for a voice processing unit, the system made up of a circuit switch unit having a TDM switch connected to a circuit interface unit for switching circuits, voice processing units for processing voice signals into packet data or packet data into voice signals, a protection voice processing unit being substituted for a malfunctioning or disabled voice processing unit among the voice processing units and cross point switches controlled by a master control unit. A cross point switch may be in the circuit switch unit be between a TDM switch and a circuit interface device for reestablishing connections if one circuit interface unit in the circuit interface device is substituted for another. A cross point switch may be in the packet switch unit between the packet switch and the packet interface device to reestablish connections if one packet interface unit in the packet interface device is substituted for another. A cross point switch may be in the circuit switch unit between the TDM and the voice processing device to reestablish connections if a VPU in the voice processing device is substituted for another. Also, a cross point switch may be in the packet switch unit between the packet switch and the VPU to reestablish connections when a VPU is substituted for another VPU.

The present invention also pertains to a method for substituting one VPU for another. The method is dependent on why the VPU is being replaced, either by board removal, function failure or command from an element management system. The MCU downloads information from the replaced VCU and transmits this information to the substituting or redundant VCU. The MCU also controls the setup of the cross point switches. Similar method are for replacement or substitution of circuit interface units and packet interface units.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
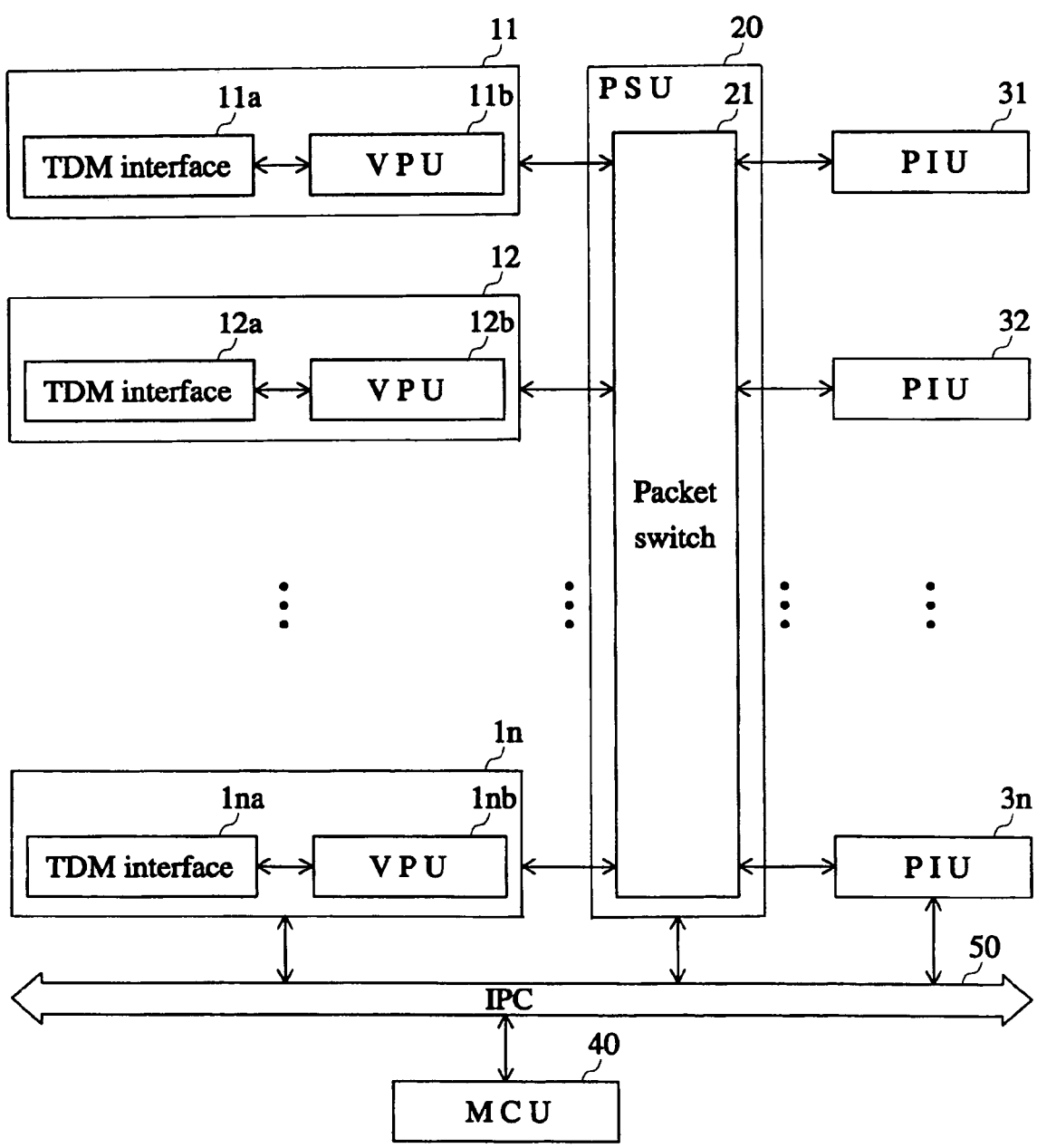
FIG. 1 is a block diagram illustrating a media gateway system where a TDM line interface and a voice processing unit are configured in the same units.

In a media gateway system, the VPU may be either formed in the same unit as a time-division multiplexing (TDM) line interface or the VPU may be formed separately from the TDM line interface. Turning to FIG. 1, FIG. 1 illustrates a media gateway system where the VPU is formed in the same unit as the TDM line interface. As illustrated in FIG. 1, a TDM interface 11a and a VPU 11b are formed in the same unit 11, and each unit 11~1n (i.e., 11 through 1n) is connected to a packet switch 21 of a packet switch unit (PSU) 20. Packet data switched in the packet switch 21 are transmitted to destinations through packet interface units (PIU) 31~3n.

In order to process TDM-to-IP calls using the media gateway system of FIG. 1, the voice signals are first received by the TDM interface 11a. Then, the voice signals are transmitted from the TDM interface 11a to VPU 11b where the voice signals are converted into packet data. The packet data is then switched in the packet switch 21 of the PSU 20, and the switched packet data is then transmitted to destinations via PIUs 31~3n.

However, the media gateway system of FIG. 1 is limited in that it cannot process TDM-to-TDM calls. This is because the media gateway system of FIG. 1 lacks a TDM switch.

Figure 2:
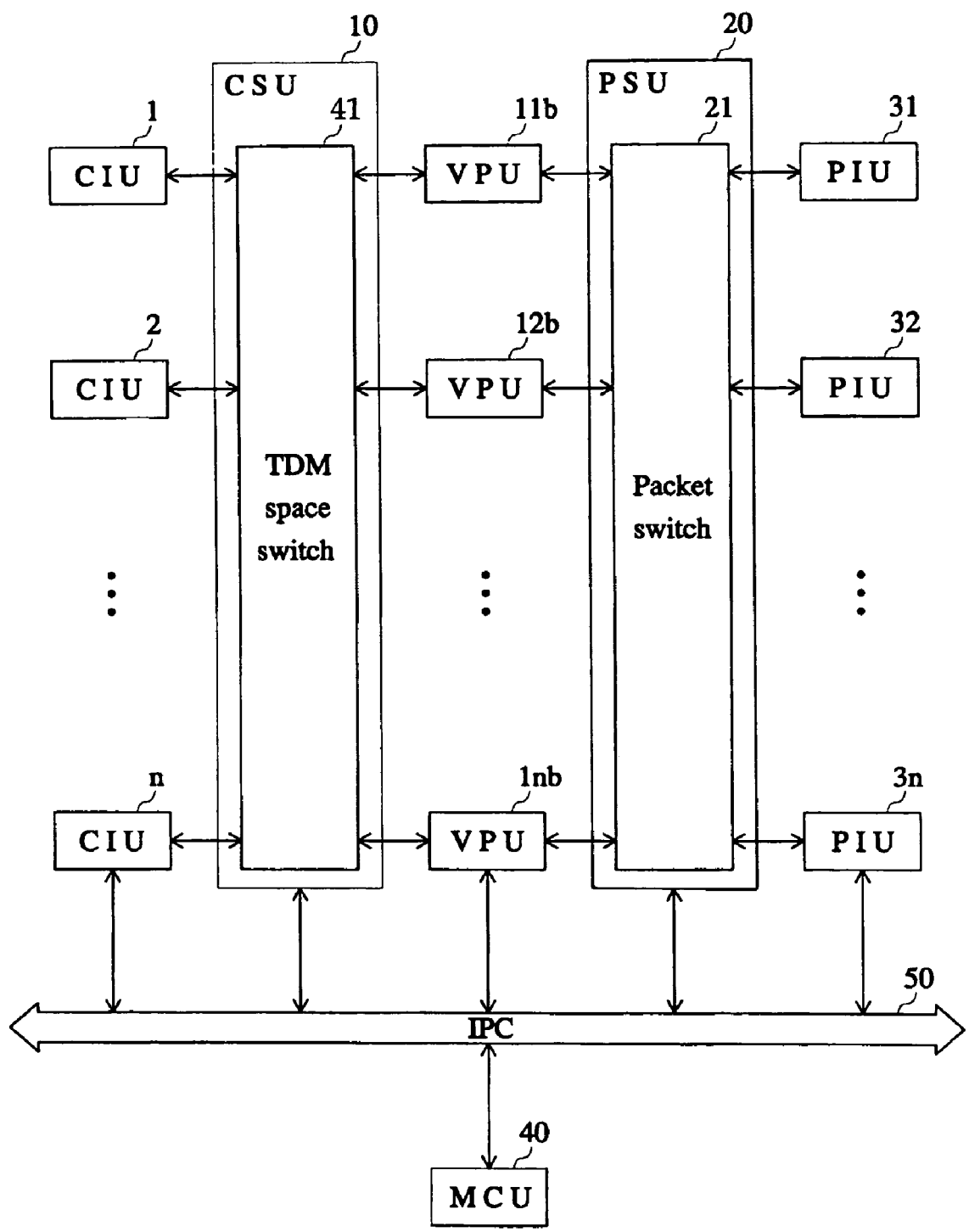
FIG. 2 is a block diagram illustrating a media gateway system where a TDM switch and a voice processing unit are individually configured.

Turning now to FIG. 2, FIG. 2 illustrates a media gateway system where the VPU and the TDM line interface system are formed separately. As illustrated in FIG. 2, circuit interface units (CIU) 1~n and a circuit switch unit (CSU) 10 having a TDM space switch 41 are both formed in separate units separated from VPUs 11b~1nb. The VPUs 11b~1nb are independent resources of the system, and thus shared by a plurality of TDM line interfaces and packet interfaces.

In the processing of TDM-to-IP calls in the system of FIG. 2, voice signals first go through CIUs 1~n and then to TDM space switch 41. In FIG. 2, the voice signals are then switched in the TDM space switch. After being switched by TDM space switch 41, the voice signals are then transformed into packet data by VPUs 11b~1nb. The packet data from the VPUs are then switched by packet switch 21. The switched packet data is then transmitted to PIUs 31~3n. Then, the packet data is sent to its destination.

In TDM-to-TDM calls using the system of FIG. 2, voice signals from CIUs 1~n are switched in the TDM space switch 41. After being switched, these voice signals go through the CIUs 1~n and are then connected to corresponding office lines. Accordingly, the media gateway system of FIG. 2 does not need an another TDM switch for processing TDM-to-TDM calls.

As described above, the VPU is a very important element of the media gateway system transmitting TDM calls through the IP network, and thus redundancy of the VPU is essential. N:1 redundancy (or protection) VPU is generally used because a voice packet processor of the VPU is high priced.

Figure 3:
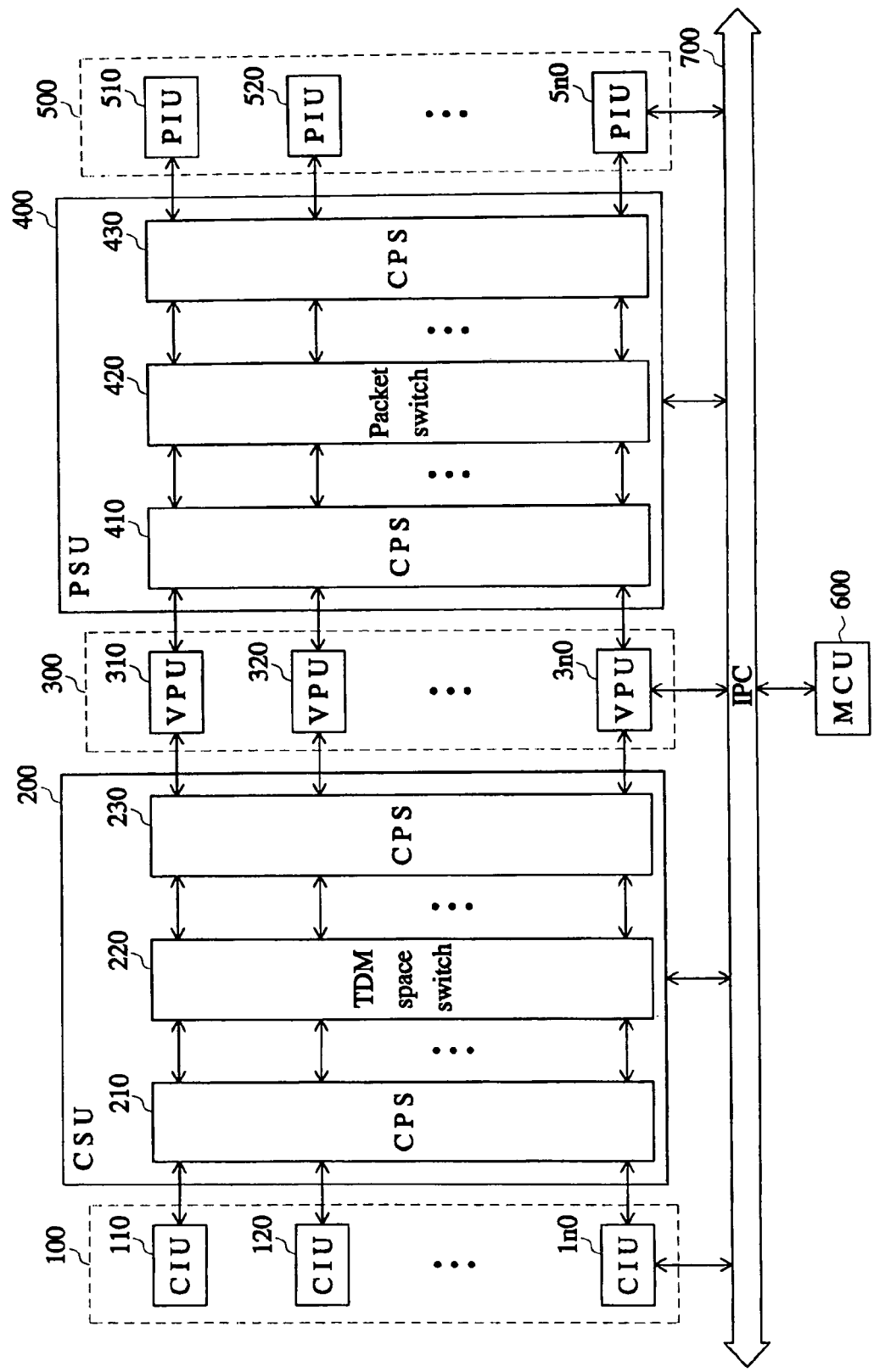
FIG. 3 is a block diagram illustrating an apparatus for N:1 redundancy in a voice processing device in a media gateway system in accordance with the principles of the present invention.

FIG. 3 is a block diagram illustrating an apparatus for N:1 redundancy of a voice processing unit in accordance with the principles of the present invention. FIG. 3 is not a practical structure for real equipment, but a conceptual structure for illustrating the principles of the present invention.

Referring to FIG. 3, the apparatus for N:1 redundancy of the voice processing unit includes a circuit interface device (CID) 100, a circuit switch unit (CSU) 200, a voice processing device (VPD) 300, a packet switch unit (PSU) 400, a packet interface device (PID) 500, a main control unit (MCU) 600, and an inter-processor communication (IPC) 700 or bus. VPD 300 is made up of a plurality of voice processing units (VPUs) 310~3n0. CID 100 is made up of a plurality of circuit interface units (CIUs) 110~1n0. PID 500 is made up of a plurality of packet interface units (PIUs) 510~5n0. The distinction between "device" and "unit" nomenclature is to clearly identify whether it is all the units within the device that are being referred to or just one unit within the device. VPD 300 is between CSU 200 and PSU 400. CSU 200 is between VPD 300 and CID 100. PSU 400 is between VPD 300 and PID 500. CID 100, CSU 200, VPD 300, PSU 400 and PID 500 are all connected to IPC 700. IPC 700 is connected to MCU 600. Any one of CID 100, CSU 200, VPD 300, PSU 400 and PID 500 can communicate with each outer using IPC 700. Also, MCU 600 can control any one of CID 100, CSU 200, VPD 300, PSU 400 and PID 500 using IPC 700.

As is further illustrated in FIG. 3, CSU 200 has a TDM space switch 220 disposed between two cross point switches (CPS) 210 and 230. CPS 210 is between TDM space switch 220 and CID 100. CPS 230 is between TDM space switch 220 and VPD 300. Like CSU 200, PSU 400 has a packet switch 420 disposed between two CPSs 410 and 430. CPS 410 is disposed between VPD 300 and packet switch 420. CPS 430 is between packet switch 420 and PID 500.

As will be discussed, it is the inclusion of CPS switches 210, 230, 410 and 430 and their respective interconnections with CID 100, CSU 200, VPD 300, PSU 400 and PID 500 along with the fact that these cross point switches are controlled by MCU 600 allows substitution of one VPU in VPD 300 for another without placing a heavy burden on the TDM space switch 220 or packet switch 420. CPS provides a function of physically connecting input and output signals.

Figure 4:
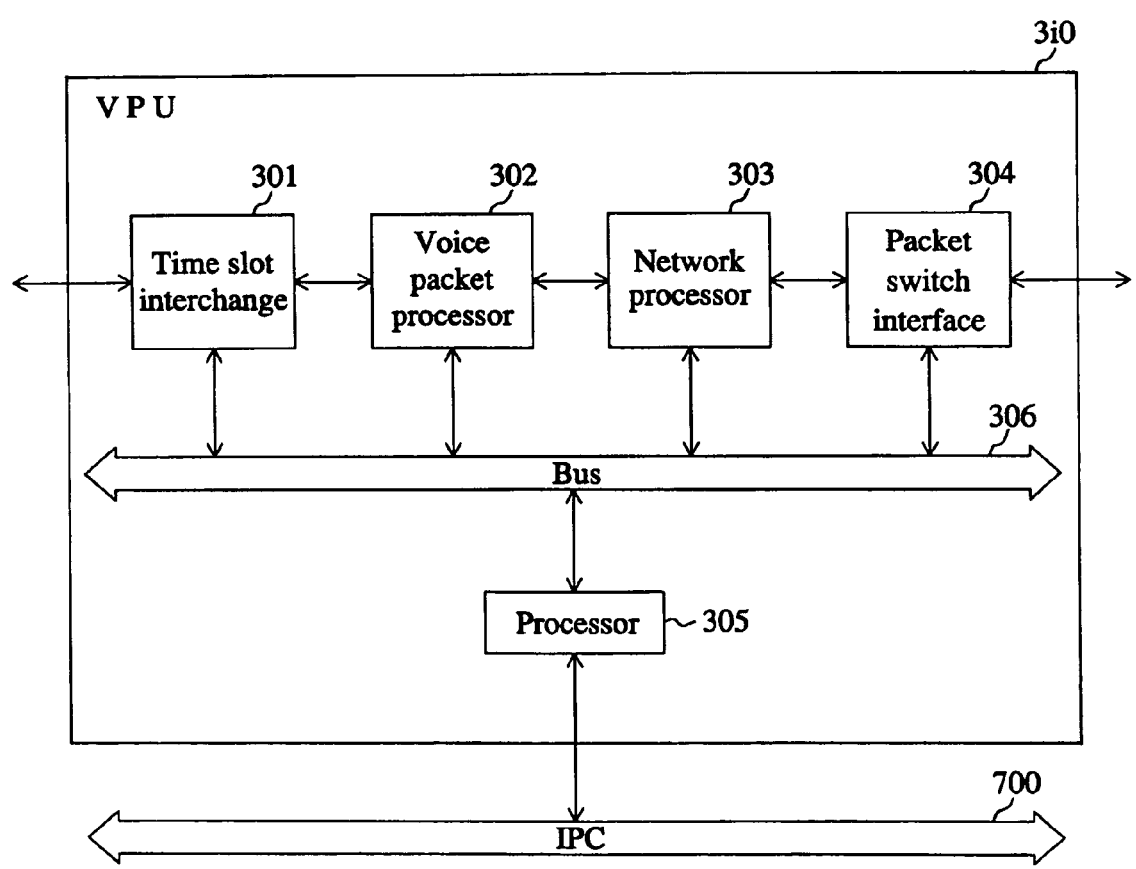
FIG. 4 is a detailed block diagram illustrating an inside structure of the voice processing unit of FIG. 3.

Turning now to FIG. 4, FIG. 4 is a detailed block diagram illustrating an inside of the voice processing unit 3i0 of FIG. 3. As illustrated in FIG. 4, in VPU 3i0, voice signals transmitted through a time slot interchange 301 are transformed into packet data in a voice packet processor 302, and output to a packet network through a packet switch interface 304 according to session information set up in network processor 303. Conversely, packet data transmitted through packet switch interface 304 are transformed into voice signals in voice packet processor 302, and output to a PSTN through a channel set up in time slot interchange 301. Here, processor 305 controls VPU 3i0 and communicates with devices 301, 302, 303 and 304 through an internal bus 306. VPU 3i0 communicates with one of MCU 600, CID 100, CSU 200, PSU 400 and PID 500 via IPC 700.

Figure 5:
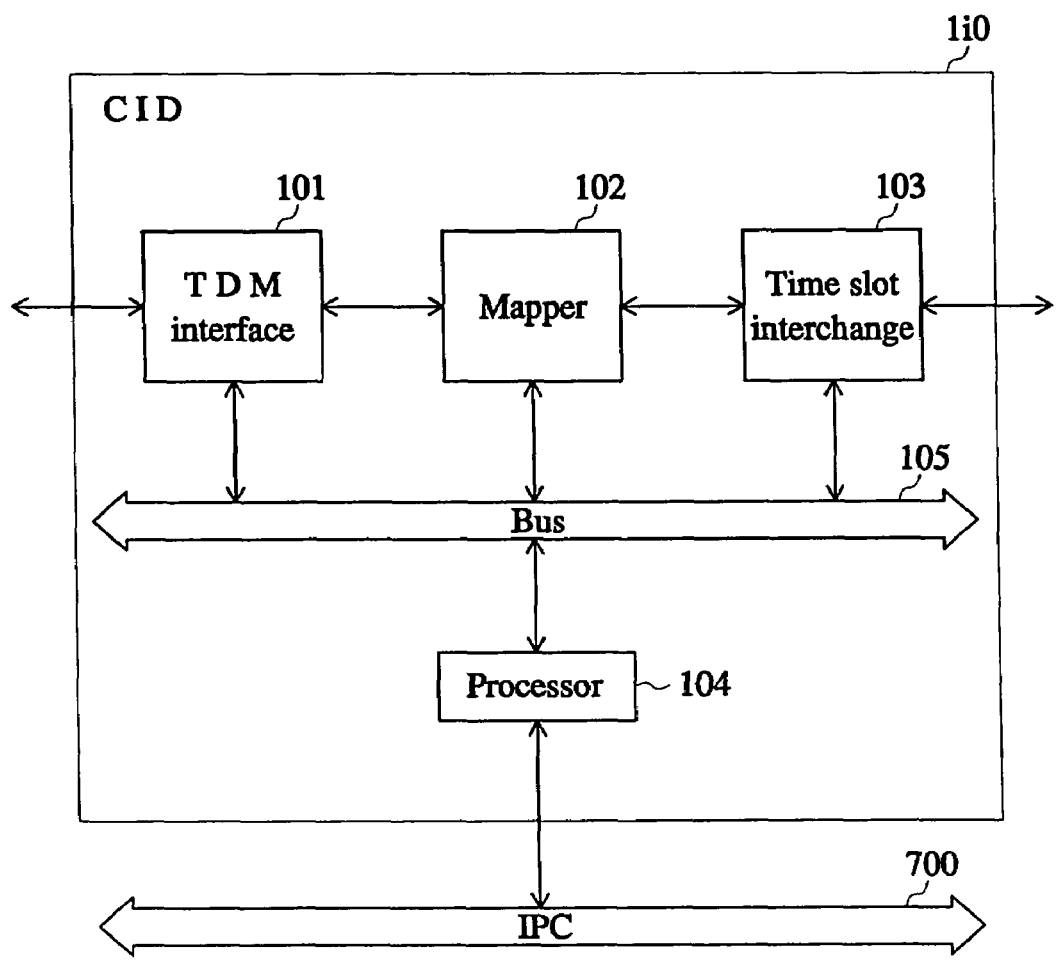
FIG. 5 is a detailed block diagram illustrating an inside structure of a circuit interface unit of FIG. 3.

Turning now to FIG. 5, FIG. 5 is a detailed block diagram illustrating an inside structure of a circuit interface unit 1i0 of a CID shown in FIG. 3. As illustrated in FIG. 5, CIU 1i0 includes a mapper 102 for mapping DS0 time slot which is a bandwidth used for one telephone voice channel into an input time slot of a time slot interchange 103. Mapper 102 is disposed between TDM interface 101 and time slot exchange 103. Channel information is transmitted to a TDM space switch 220 through time slot interchange 103. As illustrated in FIG. 5, internal bus 105 interconnects TDM interface 101 with mapper 102 with the time slot exchange 103 with internal processor 104. Processor 104 controls the CIU 1i0, and communicates with TDM interface 101 with mapper 102 with time slot exchange 103 internal bus 105. CIU 1i0 communicates with MCU 600, CSU 200, VPD 300, PSU 400 and PID 500 via IPC 700.

Figure 6:
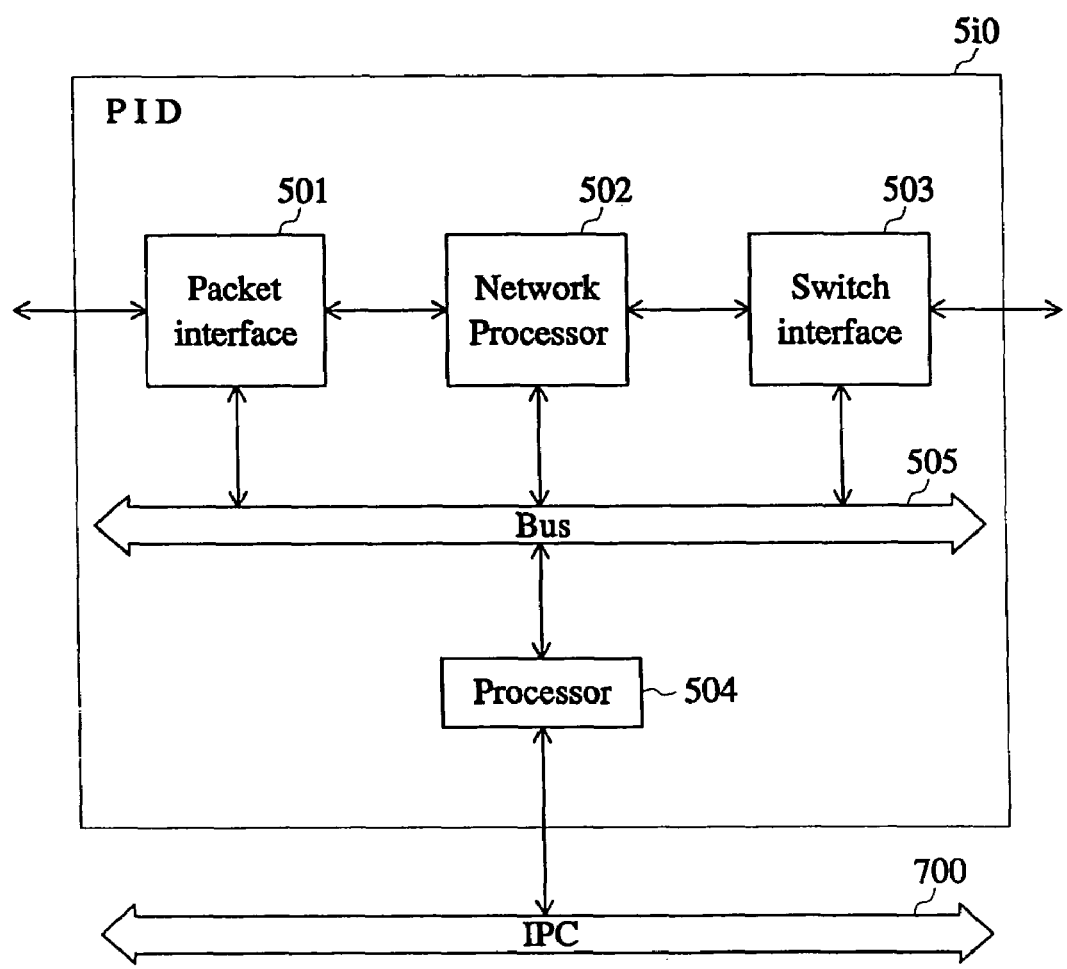
FIG. 6 is a detailed block diagram illustrating an inside structure of a packet interface unit of FIG. 3.

Turning now to FIG. 6, FIG. 6 is a detailed block diagram illustrating an inside structure of the packet interface unit 5i0 of a PID shown in FIG. 3. As depicted in FIG. 6, PIU 5i0 outputs the packet data from a packet interface 501 to the PSTN through a switch interface 503 according to session information of a network processor 502. Here, processor 504 controls PIU 5i0, and communicates with packet interface 501, network processor 502 and switch interface 503 via internal bus 505. PIU 5i0 communicates with of the CID 100, CSU 200, VPD 300, PSU 400 and MCU 600 via IPC 700.

Figure 7:
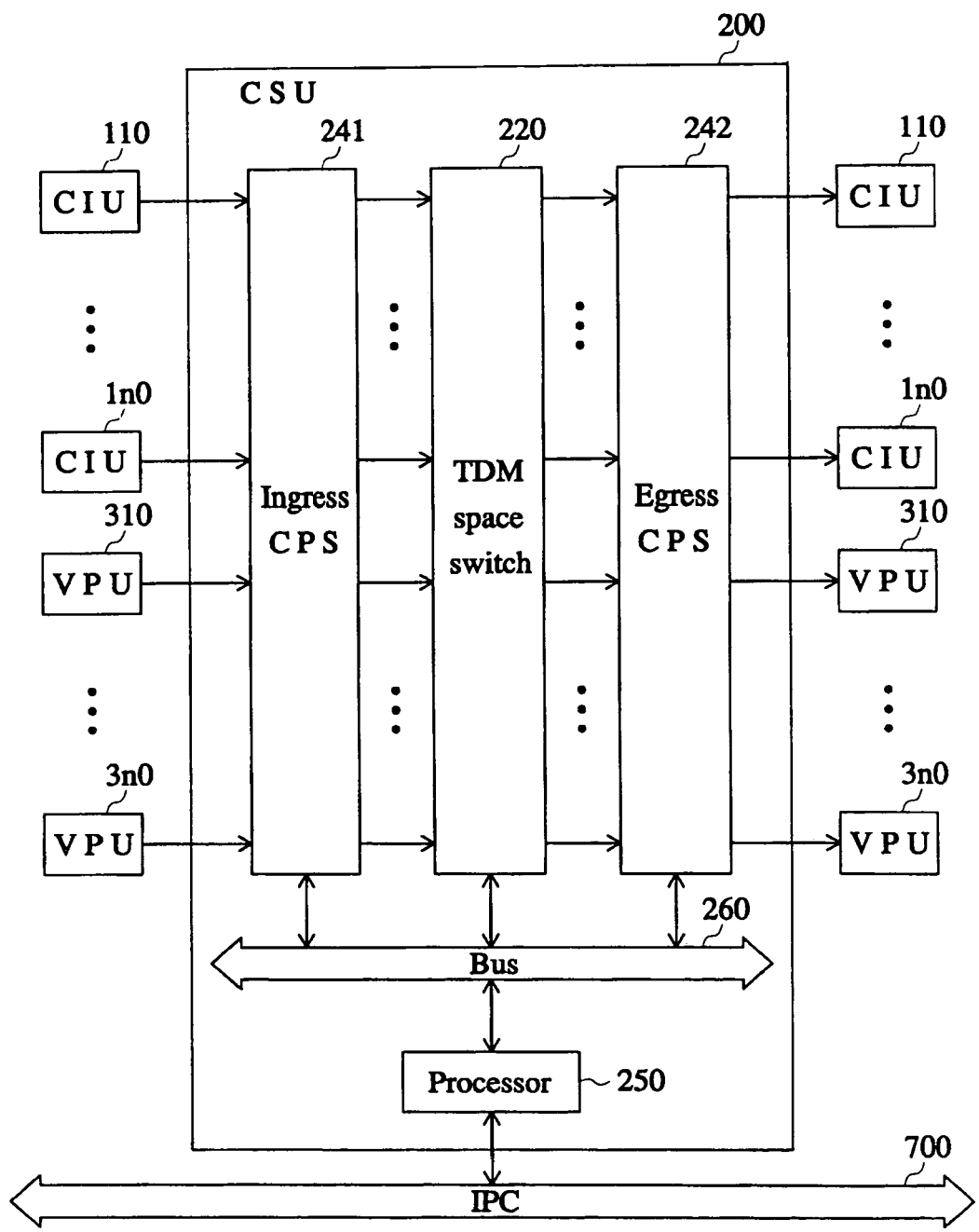
FIG. 7 is a detailed block diagram illustrating a practical structure of a circuit switch unit of FIG. 3.

Turning now to FIG. 7, FIG. 7 is a detailed block diagram illustrating a practical structure of a circuit switch unit 200 of FIG. 3. FIG. 7 is a practical structure for real equipment. Referring to FIG. 7, CIUs 110~1n0 transmit voice signals from PSTN subscribers to TDM space switch 220 in CSU 200. When the subscribers intend to make calls through the PSTN in TDM space switch 220 (i.e., TDM-to-TDM), the calls are connected to receiving terminals through CIUs 110~1n0 on the right hand side of FIG. 7. In such a scenario for a TDM-to-TDM call, CPS 210 of FIG. 3 serves as both an ingress and an egress CPS.

In the case that the subscribers make calls to an IP network (i.e., TDM-to-IP), the voice signals must be transmitted to VPUs 310~3n0 in order to convert the voice data into packet data. The packet data generated in VPUs 310~3n0 are switched in a packet switch 420 of PSU 400, and transmitted to an IP phone or PC through PIUs 510~5n0.

Figure 8:
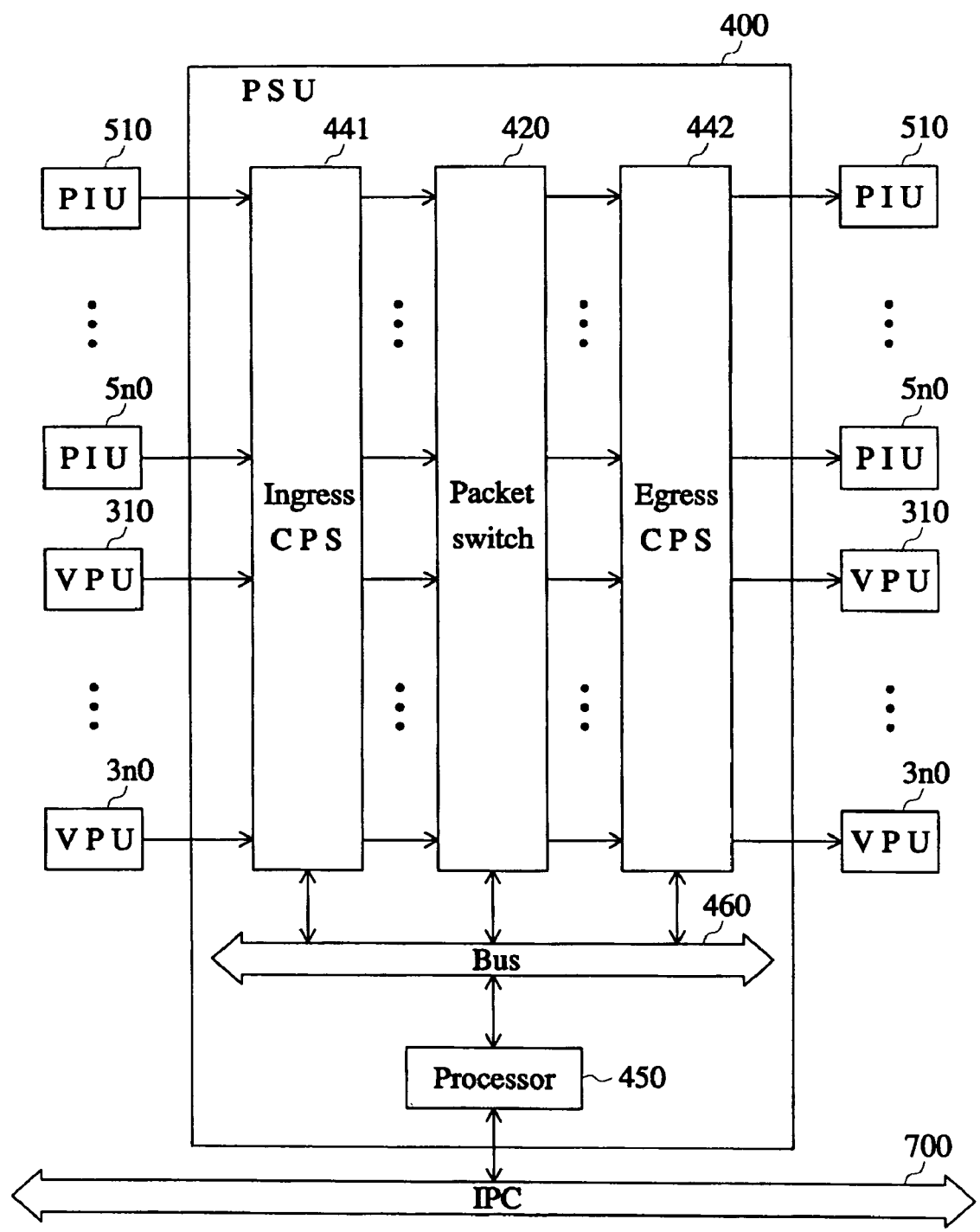
FIG. 8 is a detailed block diagram illustrating a practical structure of a packet switch unit of FIG. 3.

Turning now to FIG. 8, FIG. 8 is a detailed block diagram illustrating a practical structure of a packet switch unit 400 of FIG. 3. FIG. 8 is a practical structure for real equipment. Referring to FIG. 8, PIUs 510~5n0 transmit packet data from PSTN subscribers to packet switch 420 in PSU 400. When the subscribers intend to make IP-to-IP calls using packet switch 420, the calls are connected to receiving terminals through PIUs 510~5n0 on the right hand side of FIG. 8.

In the case that the subscriber makes an IP-to-TDM call, the packet data must be transmitted to VPUs 310~3n0 in order to convert the packet data into voice signals. The voice signals generated in VPUs 310~3n0 are then switched in TDM space switch 220 of CSU 200, and the signals are then transmitted to a PSTN through CIUs 110~1n0.

Figure 9:
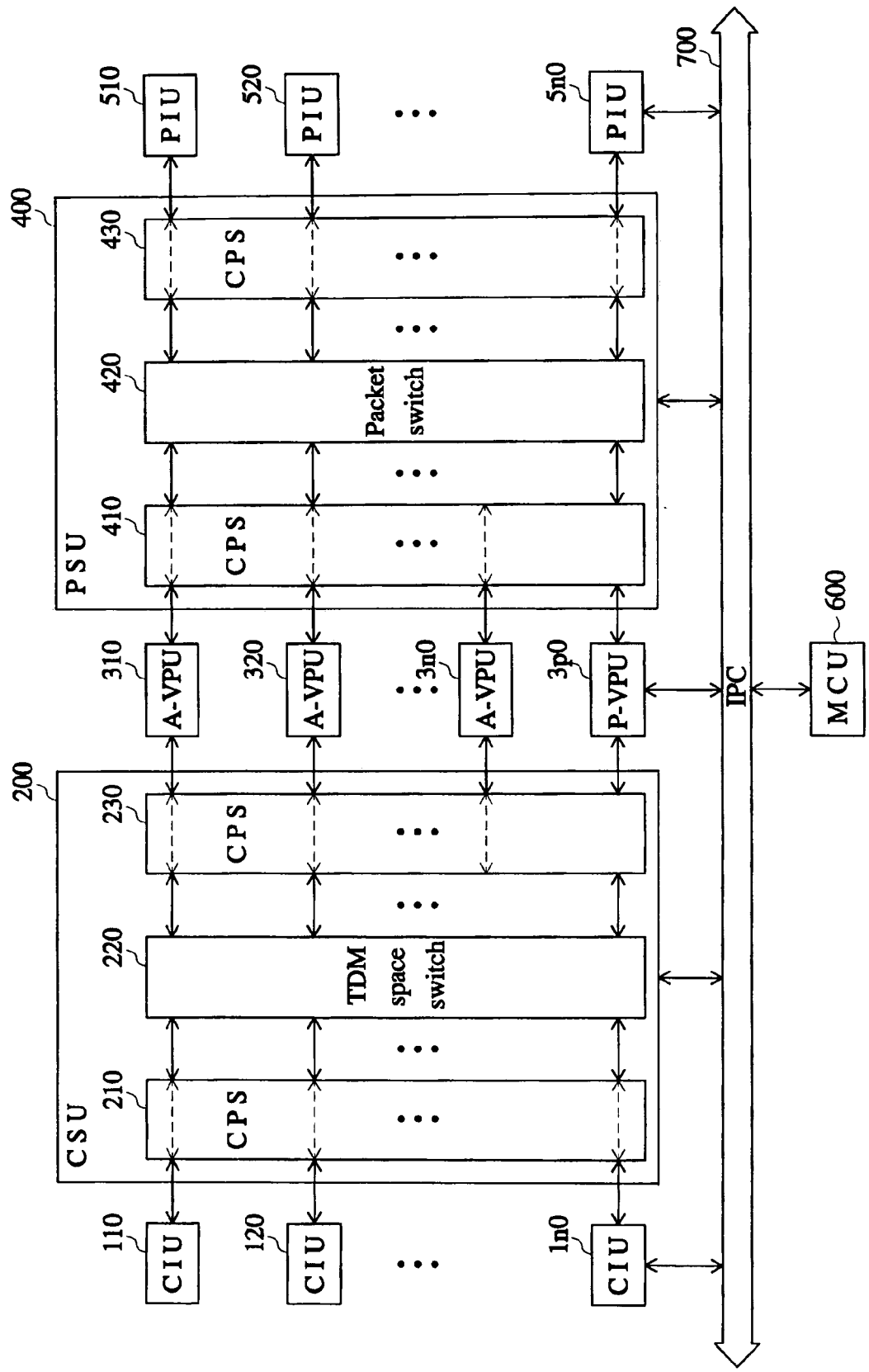
FIG. 9 is a block diagram illustrating a setup type of cross point switches in a normal status of the media gateway system in accordance with the principles of the present invention.

FIG. 9 is a block diagram illustrating a setup setting of cross point switches 210, 230, 410 and 430 when there is no substitution of a redundant VPU for an active VPU in the media gateway system of FIG. 3. As illustrated in FIG. 9, ports having the same input and output port numbers are directly connected in the CPSs during the normal operation of the VPD. In this case, CSU 200 and PSU 400 are operated in the same manner as when CIUs 110~1n0, VPUs 310~3n0 and PIUs 510~5n0 are connected directly to TDM space switch 220 and the packet switch 420 without the CPSs 241, 242, 441 and 442.

Figure 10:
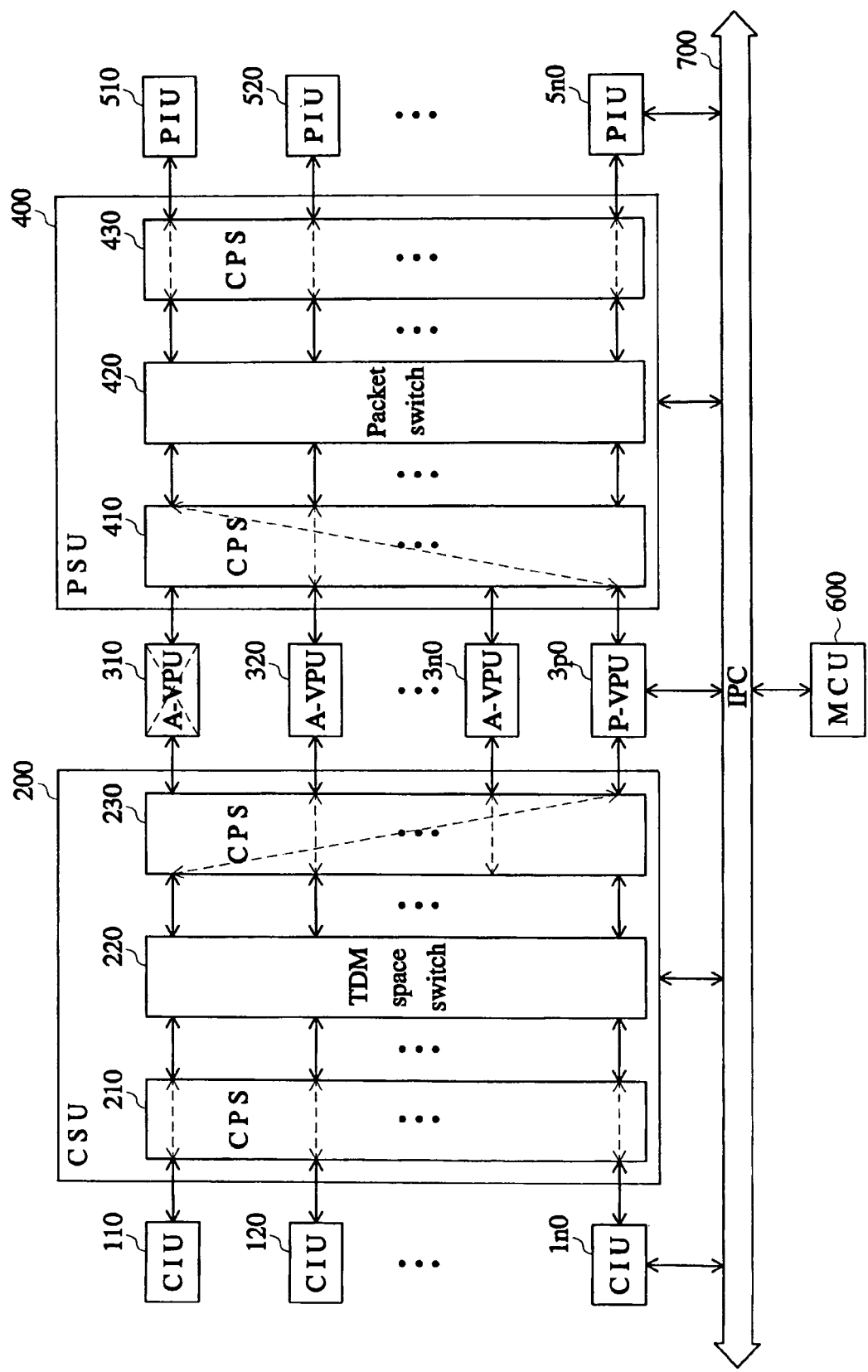
FIG. 10 is a block diagram illustrating a setup type of the cross point switches in a redundant switch process of the media gateway system in accordance with the principles of the present invention.

Turning now to FIG. 10, FIG. 10 is a block diagram illustrating a setup type of cross point switches 210, 230, 410 and 430 when protection VPU 3p0 is substituted for active VPU 310. MCU 600 programs CPSs 230 and 410 to switch so that protection VPU 3p0 can connect with the same ports of TDM space switch 220 and packet switch 420 as did the active VPU 310 of FIG. 9. When the active VPU (A-VPU) 310 is disabled for any one of a number of reasons, MCU 600 causes the connection information of A-VPU 310 to transfer to P-VPU 3p0 and then the settings of CPS 230 and 410 are changed by the MCU 600.

In FIG. 10, since it is a VPU that is being substituted, and not a CIU or a PIU, only CPSs 230 and 410 are altered and not the settings in CPSs 210 and 430. If a CIU were to be substituted instead, only the settings in CPS 210 would change. If only a PIU were to be substituted for another PIU, only the settings of CPS 430 would be substituted.

Figure 11:
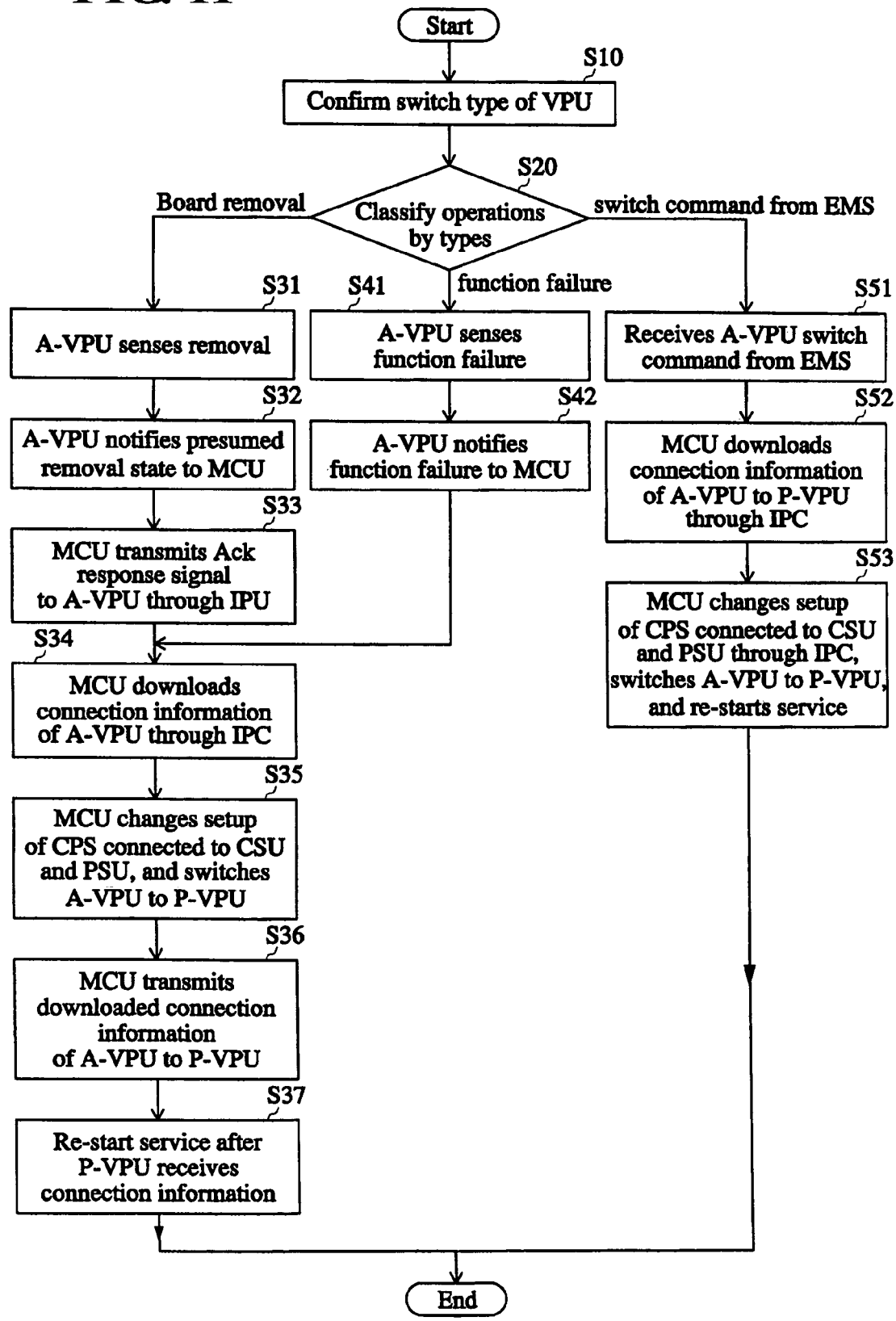
FIG. 11 is a flowchart illustrating an N:1 redundant switch process of the voice processing unit according to the principles of the present invention.

FIG. 11 is a flowchart illustrating an N:1 redundancy switch process of the VPU in the media gateway system of FIG. 3 accordance to the principles of the present invention. The method for N:1 redundancy of the VPU will now be described in detail with reference to FIGS. 10 and 11.

The existence of a switch type of the A-VPU 310 is confirmed (S10). When A-VPU 310 malfunctions, corrective action is taken depending on the cause of the malfunction. For example, if A-VPU 310 fails because of board removal, the process continues with step S31 in FIG. 11.

Assuming that A-VPU 310 is to be disabled because of board removal, MCU 600 senses the removal at step (S32). The MCU 600 then transmits an acknowledge response signal to the A-VPU 310 through the IPC 700 in step (S33). In order to switch A-VPU 310 due to board removal, connection information of A-VPU 310 must be rapidly downloaded before the board removal in step S34. Therefore, the connection information of A-VPU 310 which will be removed is downloaded to the MCU 600 through the IPC 700 in step (S34). Because necessary information of the A-VPU 310 has been downloaded in step S34 prior to actual removal, the board removal does not influence the system.

Now, MCU 600 changes the setup of CPSs 230 and 410 connected to CSU 200 and PSU 400, and MCU 600 switches A-VPU 310 to P-VPU 3p0 (S35). When P-VPU 3p0 has been connected in S35, MCU 600 transmits the connection information downloaded from A-VPU 310 to P-VPU 3p0 through IPC 700(S36). After P-VPU 3p0 receives the connection information, the service is resumed (S37) and the media gateway system functions without A-VPU 310 and without altering TDM space switch 220 or altering packet switch 420.

On the other hand, when A-VPU 310 is disabled because of function failure in step S20, the control in FIG. 11 passes to step S41 instead of S31. In step S41, the A-VPU 310 senses the function failure. Then, A-VPU 310 notifies MCU 600 of this failure in step (S42). Then, steps S34 through S37 are then carried out as in the case of board removal.

When A-VPU 310 malfunctions in step S20 because of a switch command received from an element management system (EMS), MCU 600 receives the switch command of A-VPU 310 from the EMS (not illustrated) in step (S51) of FIG. 11. Then, MCU 600 directly downloads connection information of A-VPU 310 to P-VPU 3*p*0 via IPC 700 in step (S52). Then, MCU 600 changes the setup of CPSs 230 and 410 connected to CSU 200 and PSU 400 respectively via IPC 700 in step S53. Also, MCU 600 switches A-VPU 310 to P-VPU 3*p*0, and resumes the service in step (S53).

Accordingly, the VPU can be easily switched to the P-VPU simply by changing the setup values of the CPS ports connected to the VPU instead of performing a channel reset of the TDM switch and database table update of the packet switch. Thus, when a P-VPU is substituted for an A-VPU according to the principles of the present invention, there is no altering of TDM space switch 220 or packet switch 420. In addition, the substitution can be performed using the cross point switches with less time than a channel reset or a database table update.

Although the discussion of the method in conjunction focused on substitution of one VPU for another, the practice of this invention is not limited thereto. For example, one CIU can be substituted for another by having MCU change the setup of CPS 210. Similarly, one PIU can be substituted for another and the CPS 430 can be modified accordingly by MCU 600 using a process similar to that of FIG. 11. As discussed earlier, in accordance with the present invention, the channel reset process of the TDM switch and the connection table/forwarding table update process of the packet switch are not required during the redundancy switch process of the VPU in the media gateway system interworked with the PSTN using the TDM switch and the IP network using the packet switch.

While the invention has been illustrated and described with reference to certain preferred embodiments thereof, it will be understood by those skilled in the art that various changes in form and details may be made therein without departing from the spirit and scope of the invention as defined by the appended claims.

What is claimed is:

1. An apparatus for redundancy of a voice processing unit in a media gateway system including a circuit switch part and a packet switch part, comprising:
   a circuit switch unit comprising a TDM space switch, the circuit switch unit being connected to a plurality of circuit interface units;
   a plurality of voice processing units converting voice signals into packet data and converting packet data into voice signals;
   a protection voice processing unit that serves to replace a disabled voice processing unit from among said plurality of voice processing units;
   a circuit-side cross point switch connecting channels switched through the TDM space switch to the corresponding voice processing units according to the setup of a main control unit;
   a packet switch unit comprising a packet switch, the packet switch unit switching packet data from the voice processing units, and outputting the switched data to a plurality of packet interface units; and
   a packet-side cross point switch connecting the packet switch unit to the voice processing units according to the setup of the main control unit, said main control unit being programmed and configured to control the whole system through an inter-processor communication to download connection information of the disabled voice processing unit to the protection voice processing unit, and to set up an input port number and an output port number of the packet side and the circuit side cross point switches during a redundancy switch process of the voice processing unit.

2. The apparatus of claim 1, wherein the circuit-side cross point switch is installed in the circuit switch unit.

3. The apparatus of claim 1, the circuit-side cross point switch connecting each of said voice processing units directly to corresponding ports on the TDM space switch and said cross point switch being transparent when no voice processing units are disabled.

4. The apparatus of claim 1, wherein connections of voice processing units to ports on the TDM switch are set up under the control of the main control unit.

5. The apparatus of claim 1, the packet-side cross point switch being installed in the packet switch unit.

6. The apparatus of claim 1, the packet side cross point switch connecting each of said voice processing units directly to corresponding ports on the packet switch and said packet side cross point switch being transparent when no voice processing units are disabled.

7. The apparatus of claim 1, wherein connections of input and output ports of the packet-side cross point switch are set up under the control of the main control unit.

8. The apparatus of claim 1, further comprising a circuit interface unit side cross point switch disposed between the plurality of circuit interface units and a TDM switch, said circuit interface unit cross point switch being controlled by said main control unit when a substitution of a redundant circuit interface unit for a disabled circuit interface unit is made.

9. The apparatus of claim 8, wherein the circuit interface unit side cross point switch is disposed within the circuit switch unit.

10. The apparatus of claim 1, further comprising a packet interface unit side cross point switch disposed between said plurality of packet interface units and the packet switch for redundancy of the packet interface units.

11. The apparatus of claim 10, wherein the packet interface unit side cross point switch is disposed within the packet switch unit.

12. The apparatus of claim 1, the main control unit being programmed and configured to download connection information of the active voice processing unit to a temporary storing unit in the main control unit, the main control unit also being programmed and configured to perform a switch process in order to rapidly switch the disabled active voice processing unit in board removal or function failure.

13. The apparatus of claim 1, wherein the main control unit is programmed and configured to directly download connection information of the disabled active voice processing unit to the protection voice processing unit, and to switch the disabled active voice processing unit to the protection voice processing unit in order to safely perform the switch process according to a forcible switch command transmitted from an element management system for maintenance and repair of the disabled active voice processing unit.

14. The apparatus of claim 1, wherein the voice processing unit has different functions according to interworking types to VoIP, VoATM and VoP networks.

15. The apparatus of claim 1, wherein the protection voice processing unit receives a function of the disabled voice processing unit from the main control unit in board initialization, and resets a voice processor and the other devices on the board.

16. The apparatus of claim 15, wherein the protection voice processing unit is not informed which voice processing unit function it will receive among the N active voice processing units, and thus receives the connection information in the initialization of the switch process.

17. A method for redundancy of a voice processing unit for processing voice signals in a media gateway system including a circuit switch unit and a packet switch unit, comprising the steps of:

confirming that an active voice processing unit is to be disabled;

sensing, by the active voice processing unit to be disabled, board removal when the switch type of the active voice processing unit is board removal;

notifying a main control unit by the active voice processing unit to be removed a presumed removal state;

transmitting an acknowledge response signal from the main control unit to the active voice processing unit to be removed via an inter-processor communication bus;

downloading connection information from the active voice processing unit which will be removed to the main control unit via the inter-processor communication bus;

changing the setup of cross point switches connected to the circuit switch unit and the packet switch unit by the main control unit;

switching off the active voice processing unit and switching on a protection voice processing unit by the main control unit;

transmitting the connection information downloaded from the active voice processing unit to the protection voice processing unit by the main control unit; and resuming service after the protection voice processing unit receives the connection information.

18. The method of claim 17, further comprising the steps of:

sensing function failure by the active voice processing unit when the switch type of the active voice processing unit is function failure;

notifying the main control unit of the function failure by the active voice processing unit;

downloading connection information of the active voice processing unit by the main control unit via the inter-processor communication;

changing the setup of the cross point switch connected to the circuit switch unit and changing the setup of the cross point switch connected to the packet switch unit by the main control unit;

switching, by the main control unit, the active voice processing unit to the protection voice processing unit;

transmitting the connection information downloaded from the active voice processing unit to the protection voice processing unit by the main control unit; and resuming service after the protection voice processing unit receives the connection information.

19. The method of claim 17, further comprising the steps of:

receiving a switch command of the active voice processing unit from an element management system when the switch type of the active voice processing unit is the switch command from the element management system;

downloading connection information of the active voice processing unit to the protection voice processing unit by the main control unit via the inter-processor communication; and changing the setup of the cross point switches connected to the circuit switch unit and the packet switch unit by the main control unit;

switching off the active voice processing unit and switching on the protection voice processing unit; and resuming service.

20. The method of claim 17, the redundancy being accomplished absent resetting the TDM switch and absent table update process for the packet switch.

* * * * *